Patented Apr. 20, 1954

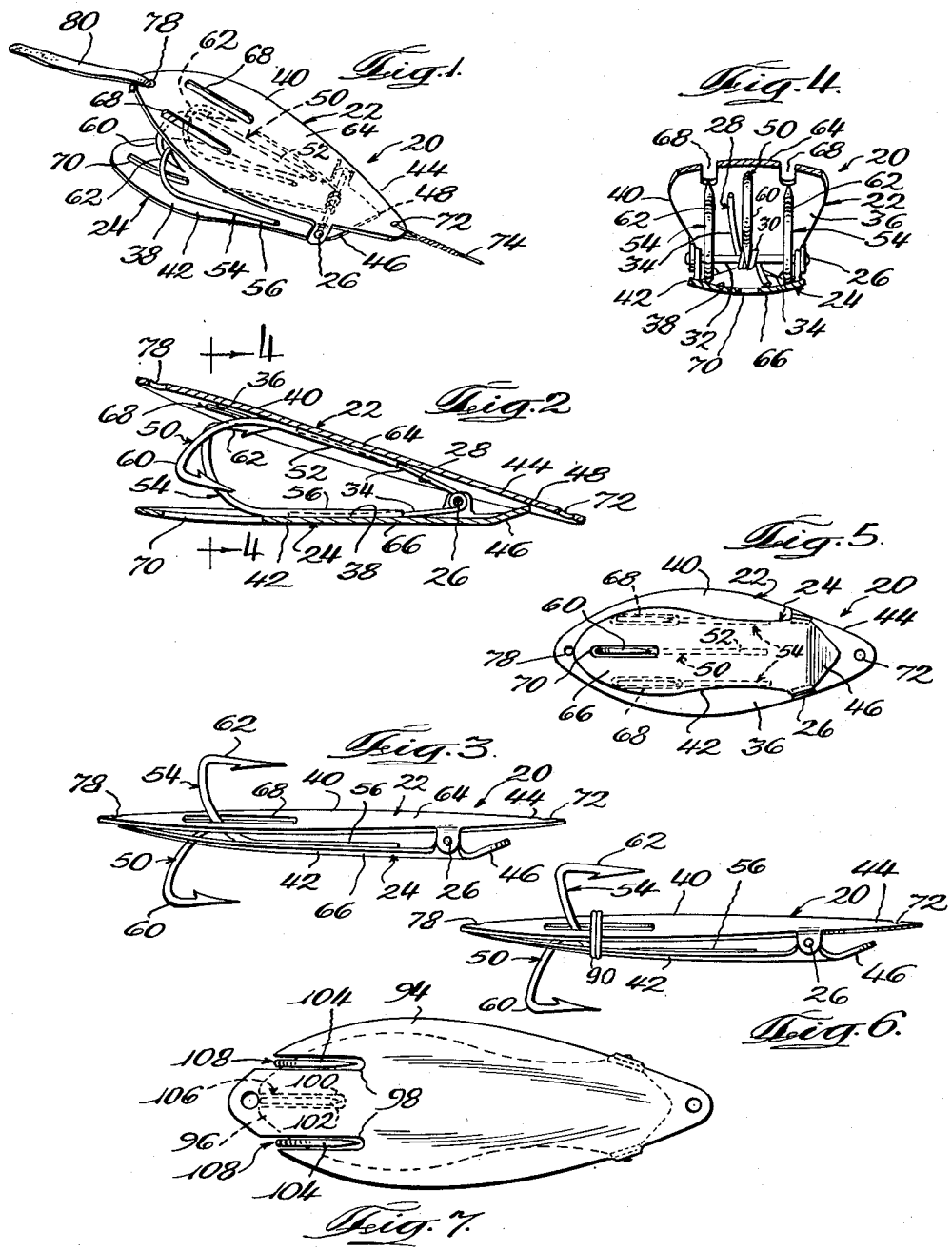

2,675,639

UNITED STATES PATENT OFFICE 2,675,639

WEEDLESS CASTING SPOON

Leif I. Borgen, Chicago, Ill.

Application July 10, 1948, Serial No. 38,123

11 Claims. (Cl. 43—35)

This invention relates to fish lures.

Fish lures used in casting are drawn through weeds and, as heretofore constructed, have tended to catch and snarl in the weeds. It is an object of my invention to provide a fish lure spoon which may be drawn through weeds without danger of catching of the weeds on the barbs of the fish hooks.

Another object of the invention is to provide a fish lure which is capable for use in casting and, with an adjustment, for use in still fishing.

A further object of the invention is to provide a casting fish lure in which the fish hook barbs are shielded from engagement with weeds and the like while the lure is being drawn through the same but which are adapted to be projected into engagement with the fish's jaws when the fish takes the lure in its mouth.

Further objects and advantages of the invention will appear as the description proceeds.

The invention will be better understood upon reference to the following description and the accompanying drawing, in which:

Fig. 1 is a perspective view of one form of my invention.

Fig. 2 is an enlarged longitudinal sectional view of the same.

Fig. 3 is a side elevational view of the same except that the spoon is collapsed, as when in the fish's mouth.

Fig. 4 is a transverse sectional view taken as indicated by the line 4—4 in Fig. 2.

Fig. 5 is a bottom plan view of the device.

Fig. 6 is a view similar to Fig. 3 but includes a rubber band by which the spoon is held collapsed for use in still fishing.

Fig. 7 is a top plan view of a modification.

Referring now more particularly to the drawing, showing illustrative embodiments of the invention, there is provided in accordance with one form, a fish lure spoon 20 comprising a pair of elongated preferably generally oval plates 22 and 24 hinged together at 26 preferably near an end of each plate to provide substantially a clam shell or alligator jaws, at least one of the plates simulating a fish in outline. A wire or other suitable spring 28 may be coiled at 30 about the hinge pintle 32 and has arms 34 engaging the inner sides 36 and 38 of the respective plates 22 and 24, said arms exerting pressure tending to separate the longer portions 40 and 42, and to bring together the shorter portions 44 and 46, of said plates, the extent of such separation being limited by the interengagement of said shorter portions as shown at 48.

The number and arrangement of hooks associated with the plates 22 and 24 may be varied as desired. For illustrative purposes, I have shown three hooks, one hook 50 with its shank 52 spot-welded or otherwise suitably secured to the inner side 36 of the plate 22, along the longitudinal axis of said plate, and the other two hooks 54 having their shanks 56 secured, by spot-welding or otherwise, to the inner side 38 of the plate 24, along lines parallel to and on opposite sides of the longitudinal axis of that plate, the planes of the three hooks being preferably substantially parallel and normal to the respective plates. The device is so designed that when it is open to its maximum extent (Fig. 2), the barbs 60 and 62 of the respective hooks 50 and 54 are disposed entirely between the outer surfaces 64 and 66 of the respective plates 22 and 24. The plate 22 has a pair of openings 68 through which the barbs 62 are adapted to pass and the plate 24 has an opening 70 through which the barb 60 is adapted to pass. The shorter end portion 44 of the plate 22 preferably extends somewhat beyond the shorter portion 46 of the plate 24 and has a hole 72 for anchoring a fish line 74. When the spoon 20 has been cast and is being pulled through the weeds and the like, the spoon is open to its fullest extent and hence the plates 22 and 24 protect the barbs 60 and 62 from engagement with the weeds. However, when a fish bites on the spoon, the jaws of the fish squeeze the plates 22 and 24 toward each other against the resistance of the spring 28, causing the barbs 60 and 62 to pass through the respective holes 68 and 70 and catch in the jaws of the fish. One of the plates, for example the plate 22, may have a hole 78 at its trailing end for anchoring a piece of pork rind 80.

The spoon 20 may be adapted for use as a lure in still fishing by the simple expedient of wrapping a rubber band 90 about the longer portions 40 and 42 of the plates 22 and 24 to such an extent as to overcome the pressure of the spring 28 and until the two plates are substantially in contact with each other, as shown in Fig. 6, the barbs 60 and 62 projecting very substantially out free of the respective plates 22 and 24. For reuse of the spoon as a casting lure, the rubber band 90 may be removed, whereupon the spring 28 will open the spoon to the fullest extent as shown in Fig. 2.

In the form of the invention above described, the holes 68 and 70 through which the barbs 62 and 60, respectively, are adapted to project are surrounded by the metal or other material of which the respective plates 22 and 24 are formed.

If desired, the holes may be made so that their edges are continuous with the edges of the plates 94 and 96 in which the respective holes are formed; that is, they may be open slots as shown at 98 and 100 in Fig. 7, to accommodate the barbs 102 and 104 of the hooks 106 and 108, respectively.

Various modifications coming within the spirit of my invention may suggest themselves to those skilled in the art, and hence, I do not wish to be restricted to the specific forms shown or uses mentioned, except to the extent indicated by the appended claims, which are to be interpreted as broadly as the state of the art may permit.

I claim:

1. A weedless casting spoon comprising a plate assembly including a pair of plates movable connected together one over the other and spring biased apart, and having mutually engageable means between the outer sides of said plates for limiting the extent to which said plates may separate, and a fish hook connected to one of said plates and having a barb disposed adjacent an end of the plate assembly and extending entirely between the outer sides of said plates when said plates are fully apart, the other plate having a slot therein, and said barb pointing toward the other end of said assembly and arranged to be projected outward substantially beyond the outer side of the other plate through said slot upon mutual approach of said plates in response to pressure of a fish's jaws.

2. A weedless casting spoon comprising a plate assembly including a pair of plates movably connected together one over the other and spring biased apart, and having mutually engageable means between the outer sides of said plates for limiting the extent to which said plates may separate, one of said plates having an entirely surrounded opening adjacent an end of the plate assembly, and a fish hook connected to the other plate and having a barb disposed adjacent said end, said barb extending entirely between the outer sides of said plates when said plates are fully apart, and said barb pointing toward the other end of said assembly and arranged to be projected freely through said opening and substantially beyond the other plate upon mutual approach of said plates in response to pressure of a fish's jaws.

3. A weedless casting spoon comprising a plate assembly including a pair of plates movably connected together one over the other and spring biased apart, and having mutually engageable means between the outer sides of said plates for limiting the extent to which said plates may separate, one of said plates having an opening adjacent an end of the plate assembly, and a fish hook connected to the other plate and having a barb disposed adjacent said end, said barb extending entirely between the outer sides of said plates when said plates are fully apart, said barb pointing toward the other end of said assembly and arranged to be projected freely through and substantially beyond the other plate upon mutual approach of said plates in response to pressure of a fish's jaws, and the edges of said opening being continuous with the edge of the plate in which said opening is formed.

4. A weedless casting spoon comprising a pair of substantially oval plates arranged one over the other and hinged together between their ends in simulation of an elongated clam shell and spring biased open at one end, said plates being interengageable entirely between the outer surfaces thereof and between the hinge and the other end of the shell to limit the extent to which the first end will open, one of said plates having an opening adjacent the first end, and a fish hook connected to one of said plates and having a barb disposed adjacent said first end, said barb extending entirely within said shell when said first end is fully open, and said barb pointing toward said other end and arranged to pass freely through said opening upon closing movement of said shell in response to pressure of a fish's jaws.

5. A weedless casting spoon comprising a pair of substantially oval plates hinged together between their ends in simulation of an elongated clam shell and spring biased apart at an end of said shell, and having mutually engageable means between the outer sides of said plates for limiting the extent to which said end of said shell may open, said plates having openings adjacent said end of said shell, and fish hooks connected to the plates and having barbs disposed adjacent said end, said barbs extending entirely between the outer surfaces of said shell when said end of said shell is fully open, said barbs pointing toward the other end of said shell and arranged to pass freely through said openings upon closing movement of the first mentioned end of said shell in response to pressure of a fish's jaws, and said barbs being disposed substantially symmetrically relative to the longitudinal axis of said shell.

6. A weedless casting spoon comprising a pair of substantially oval plates hinged together between their ends in simulation of an elongated clam shell and spring biased apart at an end of said shell, and having mutually engageable means between the outer sides of said plates for limiting the extent to which said end of said shell may open, said plates having openings adjacent said end of said shell, and a pair of fish hooks connected to one plate and a fish hook connected to the other plate, the barbs of said hooks being disposed adjacent said end and extending entirely between the outer surfaces of said shell when said end of said shell is fully open, said barbs pointing toward the other end of said shell and arranged to pass freely through said openings upon closing movement of the first mentioned end of said shell in response to pressure of a fish's jaws, and the barb of the hook on said other plate being disposed in a plane between the planes of the barbs of the hooks on said one plate.

7. A weedless casting spoon comprising a plate assembly including a pair of plates movably connected together one over the other and spring biased apart, and having mutually engageable means between the outer sides of said plates for limiting the extent to which said plates may separate, and a fish hook connected to one of said plates and having a barb disposed adjacent an end of the plate assembly and extending entirely between the outer sides of said plates when said plates are fully apart, said barb pointing toward the other end of said assembly and arranged to be projected beyond the other plate upon mutual approach of said plates in response to pressure of a fish's jaws, and said barb being disposed immediately adjacent said other plate so as to project outward therebeyond upon relatively slight approach of said plates from fully open position.

8. A weedless casting spoon comprising a plate assembly including a pair of plates movably connected together one over the other and spring biased apart, and having mutually engageable means between the outer sides of said plates for limiting the extent to which said plates may separate, a fish hook connected to one of said plates and having a barb disposed adjacent an end of the plate assembly and extending entirely between the outer sides of said plates when said plates are fully apart, said barb pointing toward the other end of said assembly and arranged to be projected beyond the other plate upon mutual approach of said plates in response to pressure of a fish's jaws, and releasable means for substantially closing said first-mentioned end of said assembly to adapt the device to still fishing.

9. A weedless casting spoon comprising a plate assembly in the form of an elongated oval wider at one end than at the other in simulation of the outline of a fish, said assembly including a pair of mutually facing plates hinged together closer to the narrower end of said assembly than to said wider end thereof, and a fish hook connected to one of said plates and having a barb arranged adjacent said wider end of said assembly, said plates being spring biased apart at said wider end of said assembly to such an extent that said barb is disposed entirely between the outer faces of said plates when said wider end is biased fully open, and said barb being projectable freely outward beyond the outer face of the other plate upon closing movement of said wider end pursuant to pressure of a fish's jaws thereon.

10. A weedless casting spoon comprising a plate assembly including a pair of mutually facing plates hinged together closer to one end of said assembly than to the other end thereof, and a fish hook connected to one of said plates and having a barb arranged adjacent the end of said assembly remote from said hinge, said plates being spring biased apart at said remote end of said assembly to such an extent that said barb is disposed entirely between the outer faces of said plates when said remote ends of said plates are fully biased apart, said barb being projectable freely outward beyond the other plate upon mutual approach of said remote ends of said plates pursuant to pressure of a fish's jaws on said remote ends of said plates, and one of said plates having a hole at said remote end thereof adjacent said barb for anchoring a strip of pork rind to lure the fish.

11. A weedless casting spoon comprising a plate assembly including a pair of mutually facing plates hinged together closer to one end of said assembly than to the other end thereof so as to provide in each plate a short portion and a long portion, said long portions being spring biased apart, the free end of one of said short portions extending beyond the other short portion and having a hole for anchoring a fish line, said short portions being mutually engageable to limit the extent to which said long portions are biased apart, and a fish hook mounted on one of said plates and having a barb disposed adjacent the long portion of the other plate and entirely between the outer faces of said plates when said long portions are fully biased apart, said barb being projectable outward beyond the other plate when said long portions are forced toward each other.

References Cited in the file of this patent
UNITED STATES PATENTS

| Number | Name | Date |
|---|---|---|
| 395,103 | Wood | Dec. 25, 1888 |
| 433,979 | Crofford | Aug. 12, 1890 |
| 768,451 | Hedlund | Aug. 23, 1904 |
| 1,497,871 | Peterson | June 17, 1924 |
| 2,143,631 | Nisses-Gagner | Jan. 10, 1939 |
| 2,392,677 | Lauby | Jan. 8, 1946 |
| 2,414,425 | Tallaksen | Jan. 14, 1947 |
| 2,569,119 | Tallaksen | Sept. 21, 1951 |